No. 896,246. PATENTED AUG. 18, 1908.
H. RIPPE.
PLANTER.
APPLICATION FILED MAR. 30, 1908.

3 SHEETS—SHEET 1.

Witnesses:

Inventor
Henry Rippe
by Chas. E. Tillman, Atty

No. 896,246.

PATENTED AUG. 18, 1908.

H. RIPPE.
PLANTER.
APPLICATION FILED MAR. 30, 1908.

3 SHEETS—SHEET 2.

UNITED STATES PATENT OFFICE.

HENRY RIPPE, OF BLUE ISLAND, ILLINOIS, ASSIGNOR OF ONE-HALF TO JOSEPH JEZISIK, OF BLUE ISLAND, ILLINOIS.

PLANTER.

No. 896,246.      Specification of Letters Patent.      Patented Aug. 18, 1908.

Application filed March 30, 1908. Serial No. 424,030.

*To all whom it may concern:*

Be it known that I, HENRY RIPPE, a citizen of the United States, residing at Blue Island, in the county of Cook and State of Illinois, have invented certain new and useful Improvements in Planters, of which the following is a specification.

This invention relates to improvements in planters, and while it is more especially intended to be used for planting corn, yet it is applicable for planting other kinds of grain; and it consists in certain peculiarities of the construction, novel arrangement, and operation of the various parts thereof, as will be hereinafter more fully set forth and specifically claimed.

The principal object of the invention is to provide a seed-planter, which shall be simple and inexpensive in construction, strong, durable and effective in operation, and so made that it will deposit the seeds at predetermined distances apart in furrows formed in the progress of the machine, and will cover said seeds with earth in the same operation.

Another object of the invention is to so construct the parts of the machine that they may be readily changed so as to vary the distances between the points at which the seeds are deposited in the furrows.

A further object of the invention is to provide means whereby the mechanism for discharging the seed from the receptacles therefor may be thrown out of gear when the machine is being moved from one point to another and when planting is not desired.

In order to enable others skilled in the art to which my invention pertains, to make and use the same, I will now proceed to describe it, referring to the accompanying drawings, in which—

Figure 1:
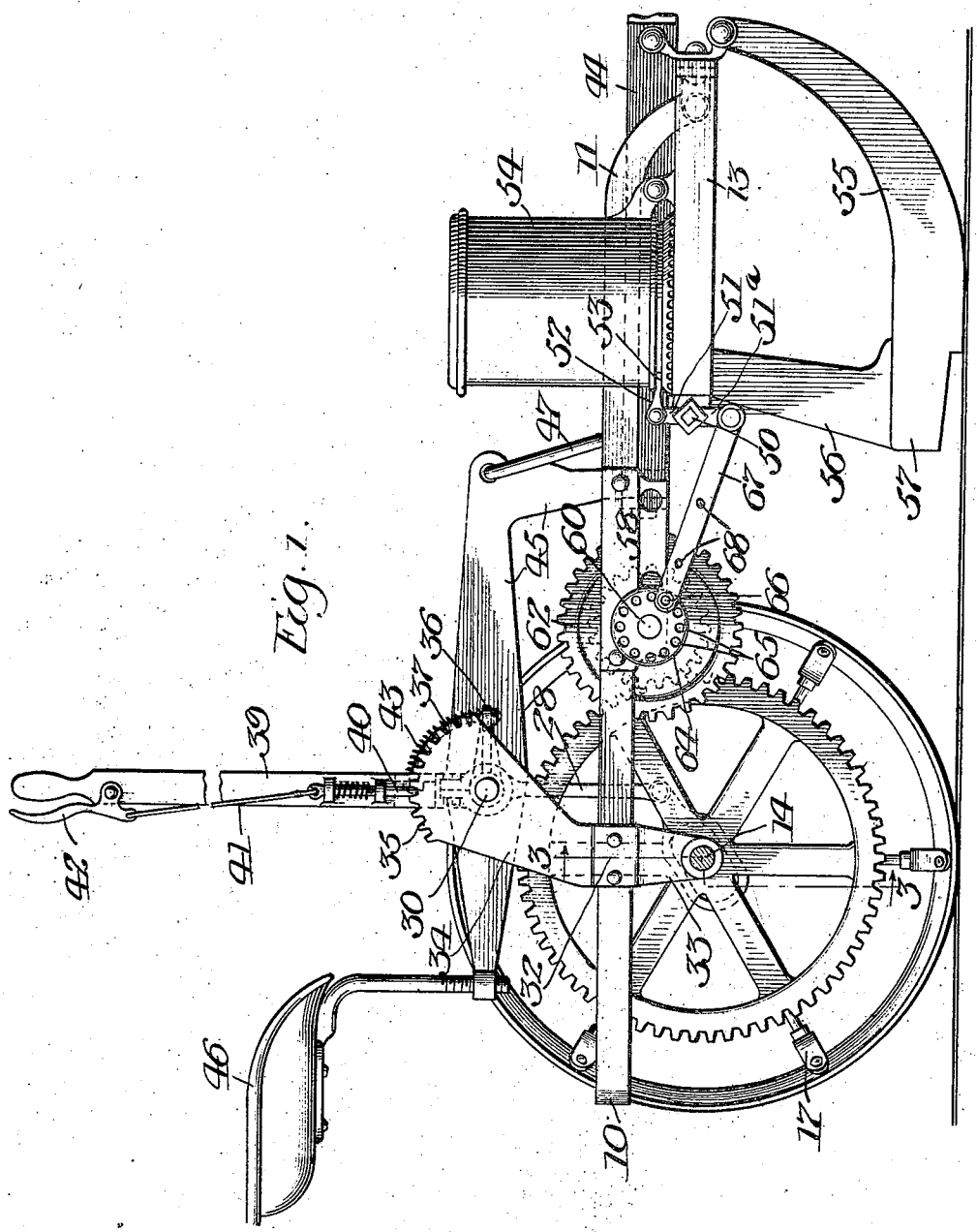
Figure 2:
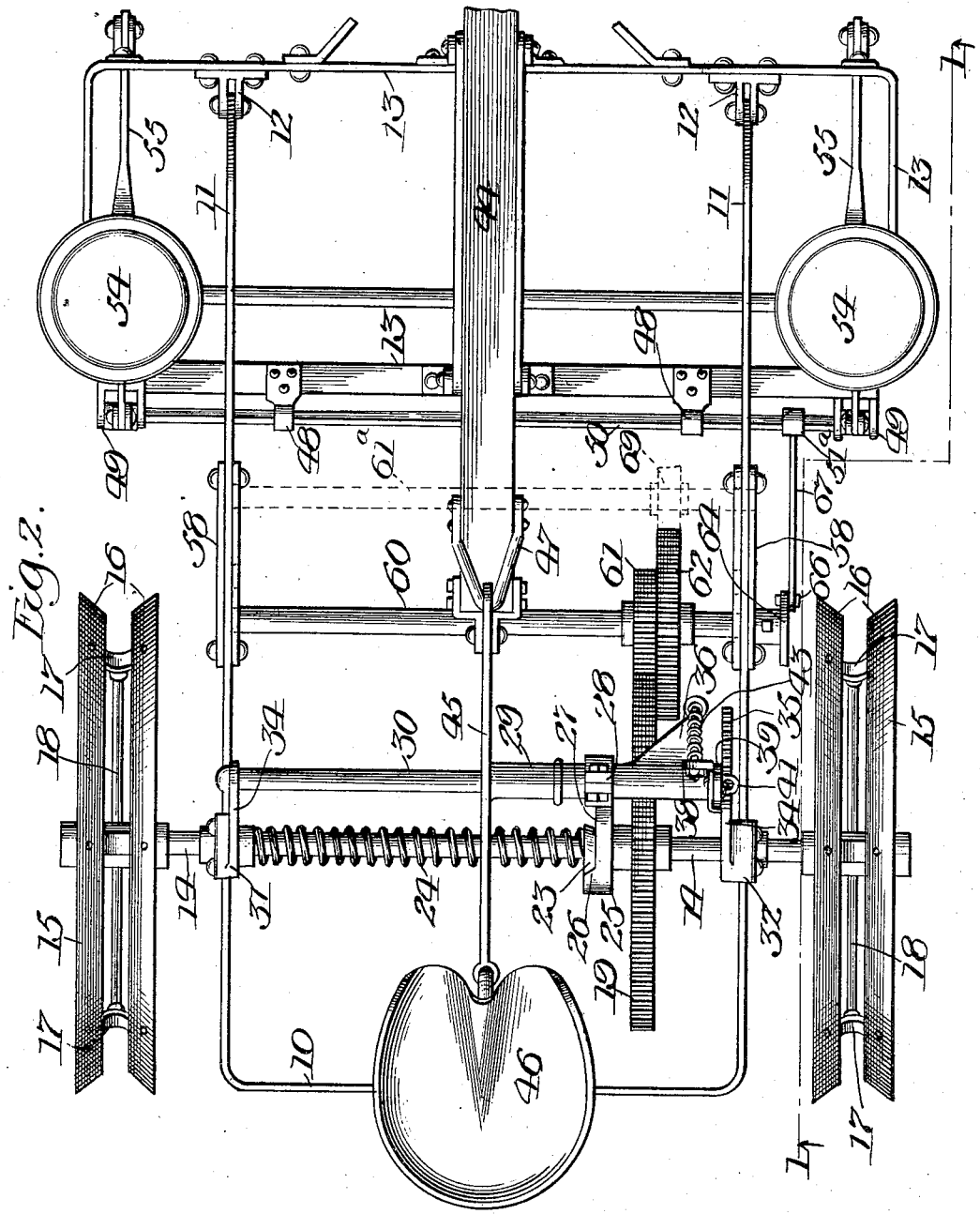
Figure 3:
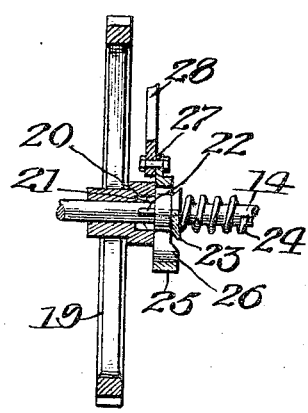
Figure 4:
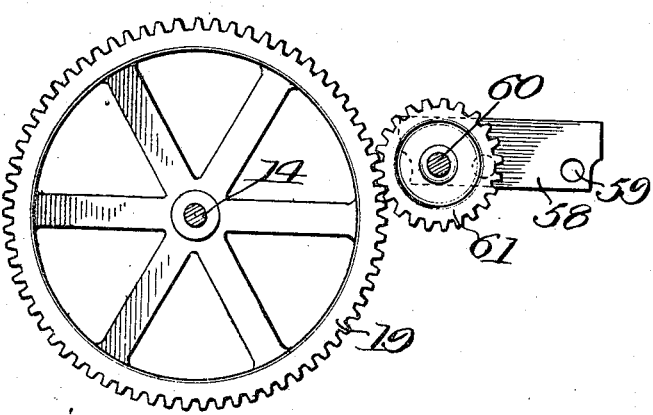
Figure 5:
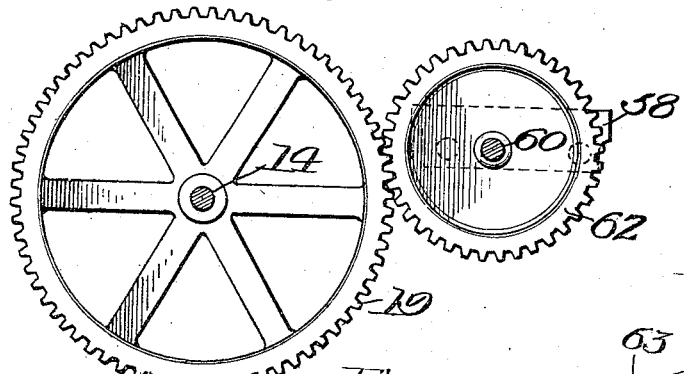
Figure 7:
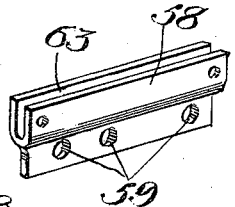
Figure 6:
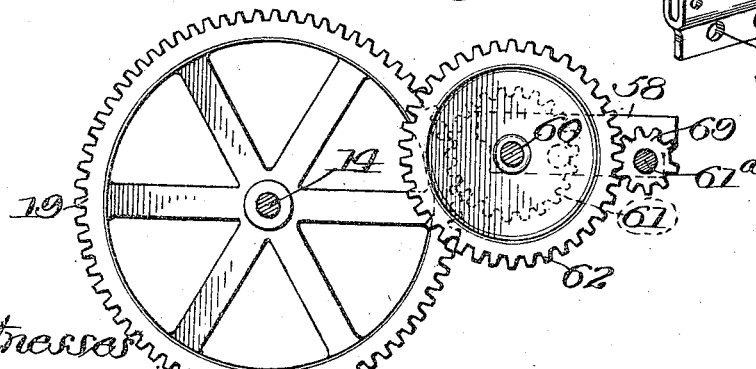

Figure 1 is a view in side elevation taken on line 1—1 of Fig. 2 looking in the direction indicated by the arrows, showing the parts in the positions they will occupy when ready for delivering the seed into the furrows at predetermined distances apart; Fig. 2 is a plan view; Fig. 3 is a sectional view taken on line 3—3 of Fig. 1 looking in the direction indicated by the arrows, showing a portion of the driving-shaft, the main gear, and a part of the clutch mechanism for throwing the seed discharging mechanism in and out of gear; Figs. 4, 5 and 6 are detail views in elevation, partly in section, of the gears for operating and regulating the seed trap releaser or second drop so that the seeds may be deposited at varying distances apart; and Fig. 7 is a detached perspective view of one of the journal-plates for the gear-shaft.

Like numerals of reference, refer to corresponding parts throughout the different views of the drawings.

The reference numeral 10 designates the main frame, which may be made of any suitable size, form and material, but preferably of metal and rectangular in shape, and is disposed horizontally as shown. The front ends of the side members 11 of the frame 10 have mounted thereon by means of rearwardly extending brackets 12 the front portion of a transversely extending or feed-receptacle-carrying-frame 13, which is also preferably made of metal and rectangular in shape.

Mounted in suitable bearings on the rear portion of the frame 10 and transversely thereof is a driving-shaft or axle 14 which has journaled on each of its ends a wheel 15, each of which consists of two spaced apart fellies 16 which are beveled towards each other on their inner surfaces, as is clearly shown in Fig. 2 of the drawings. The fellies 16 are connected together by means of a number of yokes 17 which are secured to the outer ends of the spokes 18 of the wheels.

Mounted on the shaft 14 near one of the sides 11 of the frame 10 is a main gear 19, the hub of which has in one of its ends a socket 20 provided at its inner end with a series of spaced apart lugs 21, or, in other words, the inner end of the socket 20 is provided with a clutch-face to engage the spaced apart projections 22 on the clutch 23 which is movably mounted on the shaft 14 and is normally held in engagement with the hub of the gear 19 by means of a spring 24 which encircles the shaft 14 and may be suitably secured thereon. As is clearly shown in Figs. 2 and 3 the clutch member 23 is tapered from its inner end outwardly, and has loosely fitted around it a collar 25 which has a cam face 26 adjacent to the inclined surface of the clutch member 23, and is also provided with an extension or arm 27 to which is pivotally secured the lower end of a rod 28, the upper end of which is secured to a sleeve 29 mounted on a shaft 30 transversely journaled above the frame 10 and slightly in front of the shaft 14 on which the traction wheels are mounted.

As shown in Figs. 1 and 2 the frame 10 has secured to its sides directly above the shaft 14 brackets 31 and 32, each of which has downwardly extending portions 33 in which the axle 14 is journaled. Each of these brackets also has an upwardly and forwardly projecting extension 34 in which the shaft 30 is journaled, and it will be noted that the extension 34 on the bracket 32 has at its upper end a segmental gear 35 to engage a dog on the operating lever, as will be presently explained.

The sleeve 29 which surrounds the portion of the shaft 30 and to which the upper end of the rod 28 is secured is provided with a forwardly extending arm 36 to which is secured one end of an upwardly curved rod 37, the other end of which is secured to a bracket 38 on the operating lever 39, the lower end of which is fulcrumed on the shaft 30 near the segmental gear 35, and said lever carries a spring-actuated pawl or dog 40 to engage the teeth of said gear. The pawl or dog has secured to its upper end one end of a rod 41, the other end of which is secured to a grip-lever 42 fulcrumed on the upper portion of the operating lever. The curved rod 37 is encircled by a spring 43, one end of which rests against the arm 36 and the other against the bracket 38 on the operating lever, and is employed to assist in actuating said lever.

As will be observed by reference to Fig. 1 the transverse or front frame of the machine is located below the front portion of the sides 11 of the main frame, and has secured thereon at about its middle the tongue or pole 44 to which the horses or propelling-power for the machine may be attached. The rear end of the tongue 44 is connected to the front lower portion of a bar 45 which extends rearwardly at about the middle of the main frame and is mounted on the shaft 30, and has at its rear end a seat 46 for the operator. As shown in Figs. 1 and 2 the bar 45 is elbow-shaped at its front portion and is connected at the elbow to the pole 44 by means of a link 47, which extends forwardly a slight distance from the lower end of said bar.

Mounted on the rear portion of the front frame 13 by means of brackets 48 and 49 is a rock-bar or shaft 50, which has secured thereon near each of its ends a crank 51, the upper end of each of which is pivotally secured to a rearwardly extending arm 52 on the seed-discharging-slides 53 of the seed-receptacles or hoppers 54, one of which is mounted on the frame 13 near each of its rear corners, and which receptacles and the seed-discharging mechanism thereof may be of the ordinary or any preferred construction. Secured at its front or upper end to the front frame 13 near each of its corners is a downwardly curved plow or furrow opener 55, which may be of the ordinary or any preferred construction, and each has its rear portion connected to the rear portion of the frame 13 by means of a hollow upright conducting tube 56, which communicate at their upper ends with the seed-receptacles 54 so that when the seeds are discharged from said receptacles they will pass down through the hollow uprights 56 and hollow rear portion 57 of the plows into the furrows formed by the latter.

Secured to each of the sides 11 of the main frame between the shaft 14 thereon and the rear portion of the front frame 13 is a journal-box or plate 58 which is provided with a series of openings 59 for the reception of the ends of the gear-shaft 60 on which is mounted two gears 61 and 62 of different diameters. As shown in Figs. 1 and 7 of the drawings each of the plates 58 is provided in its upper portion with a longitudinal groove 63 to receive the sides 11 of the main frame to which said plates are secured, and that their apertured portions are located below the said sides.

The shaft 60 has mounted on its end adjacent to the segmental gear 35 a disk 64, which is provided with a series of openings 65 near its periphery to receive a pin 66 used for connecting one end of a pitman 67 thereto, the other end of which is connected to a crank 51$^a$ on the rock-shaft 50 which operates the seed-discharging-slides. As shown in Fig. 1 the bar or pitman 67 is provided with a series of openings 68 in which the pin 66 may be placed when the shaft 60 is adjusted in the different openings 59 of the journal-plates 58 therefor.

From the foregoing and by reference to the drawings it will be clearly understood and readily seen that, when the shaft 60 is located in the rear openings of the journal-plates 58 so that the main gear 19 will mesh with the gear 61 (see Figs. 2 and 4), the seed delivered from the receptacles 54 will be deposited in the furrows produced by the plows 55 at regular distances apart, and that if it be desired to plant the seeds at greater distances apart the shaft 60 may be removed from the rear openings in the journal-plates 58 and placed in the middle openings in said plates, when, by shifting the gears 61 and 62 on the shaft 60 so that the latter gear will mesh with the master gear 19 (see Fig. 5) and by connecting the bar 67 to the wheel 64 by means of a pin inserted through the middle one of the openings 68 in said bar, it is apparent that the operation of the seed-delivering-slides 53 in the receptacles 54 will be less frequent, and, consequently, the seeds will be deposited at greater distances apart. When it is desired to plant the seeds at very short distances apart, or at less distances apart than will be done by the arrangements shown in Figs. 2 and 4, the shaft 60 may be placed in the position shown in Fig. 2, and an auxiliary shaft 61$^a$ (see Fig. 6 and dotted lines in Fig. 2) carrying a pinion 69 may be inserted in the front openings 59 of the journal-plates 58, so that the gear 69 will mesh with the gear 62, when by connecting the rod 67 to the wheel 64, which should be removed from the shaft 60 and placed on the shaft 61ª, it is obvious that the seed-delivering-slides 53 in the receptacles 54 will be moved very rapidly, thereby causing the seeds to be deposited at very short distances apart. As the machine is driven over the ground, it is apparent that the plows 55 will produce furrows and that the inwardly beveled fellies 16 of the wheels will force the loose earth back into the furrows, thus causing the seed to be covered. In driving the machine from one point to another, the parts may be thrown out of gear by moving the lever 39 rearwardly, in which operation it is manifest that the cam-face of the collar 25 will cause the clutch member 23 to be disengaged from the clutch-face of the hub of the master gear, thus leaving said gear and the one with which it meshes inactive.

Having thus fully described my invention, what I claim as new, and desire to secure by Letters-Patent, is—

1. The combination with a main frame, of a driving-shaft transversely journaled on the rear portion thereof, a wheel journaled on each end of the driving-shaft and each having spaced apart inwardly beveled fellies, spaced apart plows suitably mounted and connected to the front portion of the main frame, a seed receptacle mounted and equipped to discharge seed at the rear portion of the plows, a main gear on the driving-shaft, a spring-pressed and lever-operated-clutch to engage said gear, a seed delivering device in the receptacle, a gear shaft detachably and transversely journaled on the main frame in front of the driving-shaft, gears of different sizes movably mounted on said gear-shaft, and means uniting the gear-shaft and said device to intermittently operate the latter.

2. The combination with a main frame, of a driving-shaft transversely journaled on the rear portion thereof, a wheel journaled on each end of the driving-shaft and each having spaced apart inwardly beveled fellies, spaced apart plows suitably mounted and connected to the front portion of the main frame, a seed receptacle mounted and equipped to discharge seed at the rear portion of the plows, a main gear loosely mounted on the driving-shaft, a seed delivering device moving in the receptacle, a lever operated clutch on the driving-shaft to engage the main gear, a gear-shaft detachably and transversely journaled on the main frame in front of the driving-shaft, gears of different sizes movably mounted on said gear-shaft, a disk mounted on the gear-shaft and having a series of openings near its periphery, a rock-shaft transversely journaled at the rear of the seed delivering device, a crank on said rock-shaft, means connecting the crank and delivering device, a pitman connected at one of its ends to said crank and having a series of openings, and a pin adapted to fit in the openings of the pitman and the openings of said disk to adjustably secure them together.

3. The combination with a wheeled main frame, of spaced apart plows mounted in front thereof and connected thereto, a seed receptacle mounted and equipped to discharge seed at the rear portion of the plows, a seed delivering device in the receptacle, a driving-shaft transversely journaled on the main frame, a main gear on the driving-shaft, a lever-operated clutch on the driving-shaft to engage said gear, a rock-shaft transversely journaled at the rear of the seed delivering device, a gear-shaft transversely and detachably journaled on the main frame in front of the main shaft, an apertured wheel mounted on the gear-shaft, a bar having means to adjustably connect it to said wheel and having connection at one of its ends with the rock-shaft, a connection uniting the rock-shaft and seed delivering device, and gears adjustably mounted and adapted to interchangeably mesh with the main gear.

HENRY RIPPE.

Witnesses:
CHAS. C. TILLMAN,
M. A. NYMAN.